Aug. 25, 1964  F. JOCHIM  3,146,085
GLASS TEMPERING APPARATUS
Filed July 18, 1960
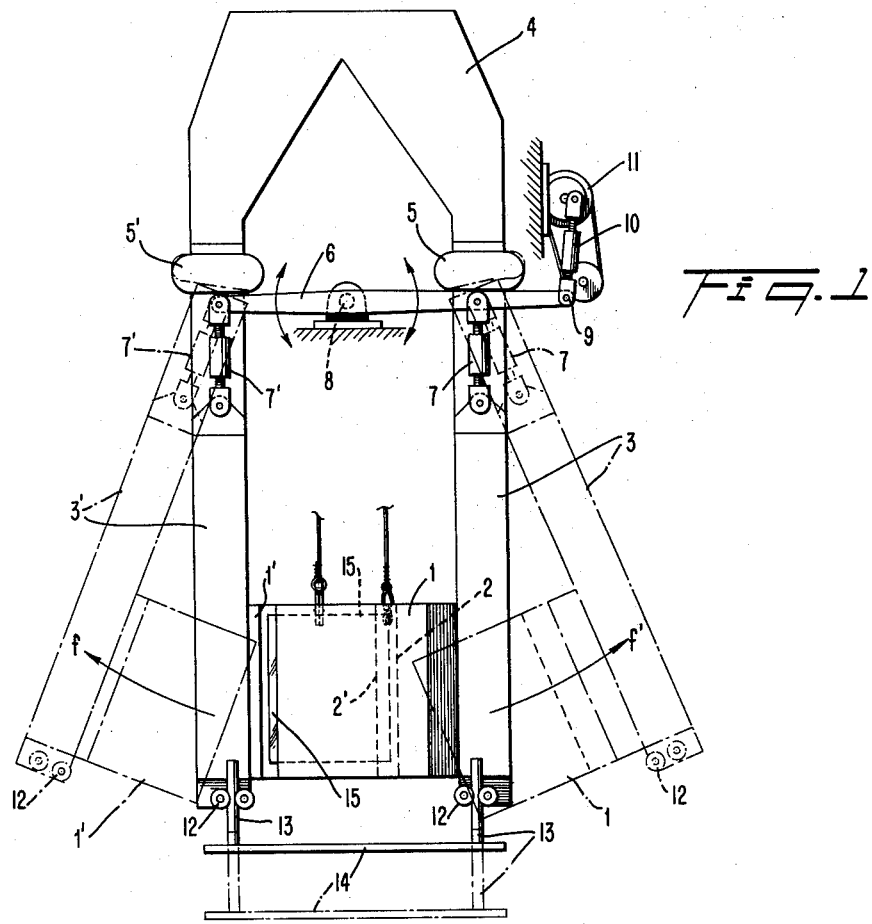
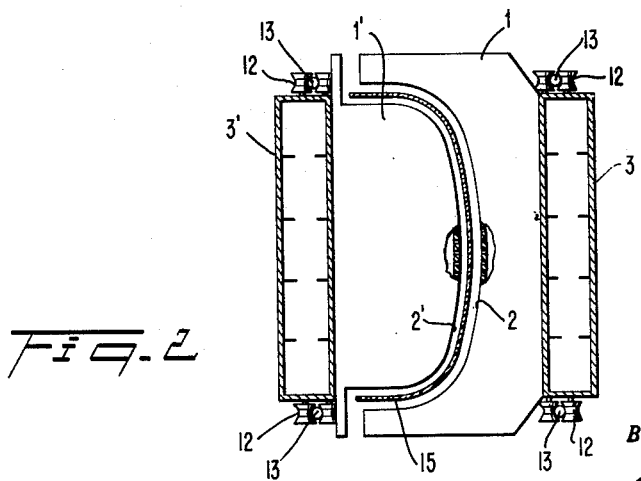
INVENTOR.
FRIEDRICH JOCHIM
BY
Bauer and Seymour
ATTORNEYS

United States Patent Office 3,146,085
Patented Aug. 25, 1964

3,146,085
GLASS TEMPERING APPARATUS
Friedrich Jochim, Herzogenrath, Germany, assignor to Compagnie de Saint-Gobain, Neuilly-sur-Seine, France
Filed July 18, 1960, Ser. No. 43,566
Claims priority, application France July 24, 1959
6 Claims. (Cl. 65—348)

This invention relates to apparatus for tempering sheets of glass.

In the usual methods of tempering glass the glass sheets are disposed between two chambers and are subjected to cooling by jets of air issuing from nozzles fixed to the chambers. To avoid non-uniform treatment of the glass which would, for example, form iridescence in the glass, the chambers are moved in such manner as continually to displace the zones of impact of the jets of air upon the sheet of glass. It is usual to move the chambers in circular paths, the movements of the two chambers being in the same direction and of the same magnitude in order to obtain equal cooling actions upon the two faces of the glass sheet.

Although the mechanisms necessary to drive the chambers in such manner may be relatively simple, they do nonetheless have the disadvantage of requiring the expenditure of a considerable amount of power, particularly when the weight of the chambers is large.

The present invention provides a novel glass tempering apparatus which overcomes the above outlined disadvantage of prior glass tempering apparatus. In glass tempering apparatus made in accordance with the present invention, the motive power necessary is reduced to that which is required to overcome the frictional resistances in the apparatus. The movements of the cooling chamber may be, as usual, circular translation or rectilinear translation movements.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in end elevation of an illustrative glass tempering apparatus in accordance with the invention; and FIG. 2 is a view in transverse horizontal section through the apparatus of FIG. 1, the section being taken generally along the line II—II of FIG. 1.

The apparatus illustrated herein is adapted for the tempering of panoramic windshields which have a marked curvature in a longitudinal direction. In the drawings such previously bent windshield, generally designated 15, is shown suspended vertically by tongs between two similar cooling chambers 1 and 1'. The chambers have a vertical extent somewhat exceeding the height of the windshield. The windshield-confronting faces 2 and 2' of chambers 1 and 1', respectively, are curved to lie parallel to the extent of the windshield, face 2 being concave and face 2' being convex. Faces 2 and 2' of the cooling chambers are provided with a plurality of nozzles, not shown in the figures, which are distributed substantially uniformly over the extents of such faces and in such manner that the jets will substantially uniformly cover the surfaces of the windshield upon movement of the chambers in a manner to be described.

The cooling chambers 1 and 1' are secured to similar vertically extending air boxes 3 and 3', respectively. The upper ends of the air boxes are connected to the respective depending branches of a Y-shaped air distributor 4 through the medium of short deformable hoses 5 and 5' which may be made, for example, of rubber or rubber-like material.

The air boxes 3 and 3' are pivotally connected at their upper ends by adjustable links 7 and 7', the lower ends of which are pivotally connected to the upper ends of the respective air boxes. The upper ends of links 7 and 7' are pivotally connected to a generally horizontal first-class lever 6 which is pivotally mounted intermediate its length on a transverse pivot pin 8 mounted between brackets as indicated. The lengths of the arms of lever 6 from the axis of pivot pin 8 to the axes of the pivot pins at the upper end of each of links 7 and 7' are the same. The lever 6 is oscillated, as indicated by the curved arrows in FIG. 1, by means of an adjustable link 10 connected to the right hand end of the lever by a pivot pin 9 and driven by an eccentric means such as a crank mechanism 11, the eccentric means being driven, in turn, as by an electric motor. The adjustable links 7, 7', and 10 are adjusted so that during operation of the apparatus the lever 6 oscillates through equal angles in both directions from the horizontal.

The lower ends of the air boxes 3 and 3', during operation of the glass tempering apparatus, are accurately guided for vertical movement by guide means, there being one such guide means on each side of each of the air boxes. The guide means in the embodiment shown consists of pairs of opposed rollers 12 secured to the air boxes, each pair of rollers receiving the respective vertical guide rod 13 secured to a horizontal plate support 14.

In the apparatus shown, the guide means 12, 13 are releasable so that air boxes 3, 3' and the chambers 1 and 1' attached thereto may be swung angularly outwardly as shown in phantom lines in FIG. 1. The guide means may conveniently be made releasable in the manner indicated by making support 14 vertically reciprocable so that it may selectively be moved into either the lowered, phantom line, position shown in FIG. 1 or raised into the operative, full line position. When plate 14 is lowered, the guide rollers 12 are released from guide rods 13, so that the air boxes and chambers may be pivoted laterally to allow the ready loading and unloading of the glass workpiece. The flexible hoses 5, 5' thus not only provide for the connection between the air boxes and the air distributor 4 under operating conditions, but also allow the air boxes and chambers to be swung as indicated without injury to such flexible connections.

A sheet of glass such as windshield 15, heated to tempering temperature, is placed in the proper location between the air chambers. The chambers and air boxes are then swung inwardly into their vertical operative positions, after which the guides 12, 13 are engaged. Thereupon the eccentric driving means 11 is placed in motion and air under pressure is admitted to the air distributor 4. The air boxes and chambers reciprocate vertically, the movements of the two combinations of elements 1, 3 and 1', 3', and their respective driving mechanisms are instantaneously at the same rate, of the same extent, and in opposite directions. Consequently, when such two cooling mechanisms are of the same weight, all that is required to guide the system is power sufficient to overcome the frictional restraints therein.

Although in the preferred illustrative example above described the air boxes and chambers are reciprocated in straight lines, they may, in accordance with the broader aspects of the present invention, be driven and guided in circular paths.

Thus the apparatus may employ a driven two-throw crank shaft mounted for rotation about its principal axis. The two crank arms are disposed at 180° from each other.

The respective sets of air boxes and chambers are pivotally connected and suspended from the respective crank arms. When the two cooling units, that is the air box and chamber of each set, have the same weight, they balance each other at all times regardless of the angular position of the crank. With such system, flexible air feeding means leading to the air boxes must be employed such that little frictional restraint is added to the system and the circular translatory motion of the cooling chambers is not disturbed.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. An apparatus for tempering heated sheets of glass by subjecting them to jets of cooling fluid, which comprises a pair of similar gas chambers, each chamber having a plurality of orifices directed toward the opposite chamber, gas conduits connected to the chambers, and supporting means to suspend the chambers for reciprocation comprising a pivot, a rockable member mounted on the pivot and means to support the gas chambers from the rockable member on opposite sides of the pivot, in balance, and reciprocable drive means operatively connected to the rockable member.

2. The apparatus of claim 1 in which the rockable member is a balanced beam mounted on the pivot.

3. The apparatus of claim 2 including means pivotally connecting a chamber to the beam whereby it may be swung away from the other chamber to permit the emplacement of a glass sheet.

4. The apparatus of claim 2 including means pivotally supporting both chambers on the beam, and guide means operably engageable with parts of the chambers remote from the beam.

5. An apparatus for tempering heated sheet of glass as claimed in claim 4, wherein the beam is connected to one end of each of the chambers, and said guide means includes cooperating means associated with each of the chambers to cause the chambers to travel vertically.

6. An apparatus for tempering heated sheets of glass as claimed in claim 5, comprising a branched gas distributor having arms, the arms of the gas distributor aligned with the respective chambers and confronting one end of each of the chambers, and flexible hose connections between the ends of the arms of the chambers.

References Cited in the file of this patent

UNITED STATES PATENTS

| | | |
|---|---|---|
| 2,068,746 | Hinsey | Jan. 26, 1937 |
| 2,131,406 | Mosmieri et al. | Sept. 27, 1938 |
| 2,167,294 | Despret | July 25, 1939 |
| 2,213,405 | Paddock | Sept. 3, 1940 |
| 2,724,215 | Gilstrap | Nov. 22, 1955 |

FOREIGN PATENTS

| | | |
|---|---|---|
| 556,558 | Great Britain | Oct. 11, 1943 |
| 586,497 | Great Britain | Mar. 20, 1947 |